(12) United States Patent
Kishi (10) Patent No.: US 12,463,603 B2
(45) Date of Patent: Nov. 4, 2025

(54) RADIO FREQUENCY CIRCUIT AND COMMUNICATION APPARATUS

(71) Applicant: Murata Manufacturing Co., Ltd., Kyoto (JP)

(72) Inventor: Yusuke Kishi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 362 days.

(21) Appl. No.: 18/327,293

(22) Filed: Jun. 1, 2023

(65) Prior Publication Data

US 2024/0063763 A1     Feb. 22, 2024

(30) Foreign Application Priority Data

Aug. 19, 2022   (JP) .................. 2022-131250

(51) Int. Cl.
*H03F 3/00*      (2006.01)
*H03F 3/195*     (2006.01)

(52) U.S. Cl.
CPC ....... *H03F 3/195* (2013.01); *H03F 2200/294* (2013.01); *H03F 2200/451* (2013.01)

(58) Field of Classification Search
CPC ............ H03F 3/195; H03F 2200/294; H03F 2200/451; H03F 2200/111; H03F 3/72; H03F 3/245

See application file for complete search history.

(56) References Cited

U.S. PATENT DOCUMENTS

| | | | |
|---|---|---|---|
| 2018/0287572 A1* | 10/2018 | Oishi | H03F 3/195 |
| 2019/0097671 A1* | 3/2019 | Dimpflmaier | H03F 3/19 |
| 2021/0159590 A1* | 5/2021 | Na | H03F 3/21 |
| 2021/0351810 A1* | 11/2021 | Gorbachov | H04B 1/04 |

FOREIGN PATENT DOCUMENTS

JP        2008-085775 A      4/2008

* cited by examiner

*Primary Examiner* — Ping Y Hsieh
(74) *Attorney, Agent, or Firm* — McDonald Hopkins LLC (57) ABSTRACT

A radio frequency circuit includes an antenna terminal, a first switch, a power amplifier, a low noise amplifier, a regulator circuit, and a second switch. The first switch has a common terminal connected to the antenna terminal, a first selection terminal connectable to the common terminal, and a second selection terminal connectable to the common terminal. The regulator circuit is connected between a first signal path and a second signal path, the first signal path being between the antenna terminal and the common terminal, the second signal path being between the power amplifier and the first selection terminal. The second switch is connected between the second signal path and the ground. The regulator circuit includes at least one of an inductor or a capacitor.

16 Claims, 3 Drawing Sheets

RADIO FREQUENCY CIRCUIT AND COMMUNICATION APPARATUS

CROSS REFERENCE TO RELATED APPLICATION

This application claims priority from Japanese Patent Application No. 2022-131250 filed on Aug. 19, 2022. The content of this application is incorporated herein by reference in its entirety.

BACKGROUND

The present disclosure relates to a radio frequency circuit and a communication apparatus and, in more detail, relates to a radio frequency circuit and a communication apparatus that perform switching between connections each of which is performed between an antenna and a corresponding one of a transmission path and a reception path.

Japanese Unexamined Patent Application Publication No. 2008-85775 discloses an antenna switch circuit (radio frequency circuit) in which an antenna switch that performs switching between connections each of which is performed between an antenna terminal and a corresponding one of two diplexers. The antenna switch is connected to the antenna terminal with a notch filter interposed therebetween. The notch filter is used to eliminate a harmonic wave component generated in the antenna switch at the time of transmitting a signal.

BRIEF SUMMARY

However, in the circuit characteristics of the antenna switch circuit, the optimum value at the time of transmitting a signal is different from the optimum value at the time of receiving a signal.

The present disclosure provides a radio frequency circuit and a communication apparatus enabled to achieve favorable circuit characteristics both at the time of transmitting a signal and at the time of receiving a signal.

A radio frequency circuit according to an aspect of the present disclosure includes an antenna terminal, a first switch, a power amplifier, a low noise amplifier, a regulator circuit, and a second switch. The first switch has a common terminal, a first selection terminal, and a second selection terminal. A common terminal is connected to the antenna terminal. The first selection terminal is connectable to the common terminal. The second selection terminal is connectable to the common terminal. The power amplifier is connected to the first selection terminal. The low noise amplifier is connected to the second selection terminal. The regulator circuit is connected to a first signal path and a second signal path. The first signal path is a path between the antenna terminal and the common terminal. The second signal path is a path between the power amplifier and the first selection terminal. The second switch is connected between the second signal path and the ground. The regulator circuit includes at least one of an inductor or a capacitor.

A radio frequency circuit according to an aspect of the present disclosure includes the antenna terminal, the first switch, the low noise amplifier, the power amplifier, the regulator circuit, and the second switch. The first switch has the common terminal, the first selection terminal, and the second selection terminal. The common terminal is connected to the antenna terminal. The first selection terminal is connectable to the common terminal. The second selection terminal is connectable to the common terminal. The low noise amplifier is connected to the first selection terminal. The power amplifier is connected to the second selection terminal. The regulator circuit is connected to the first signal path and the second signal path. The first signal path is a path between the antenna terminal and the common terminal. The second signal path is a path between the low noise amplifier and the first selection terminal. The second switch is connected between the second signal path and the ground. The regulator circuit includes at least one of the inductor or the capacitor.

A communication apparatus according to an aspect of the present disclosure includes the radio frequency circuit and a signal processing circuit. The signal processing circuit is connected to at least one of the power amplifier or the low noise amplifier of the radio frequency circuit.

With the radio frequency circuit and the communication apparatus according to the aspects of the present disclosure, the circuit characteristics of the radio frequency circuit may be achieved in both of signal transmitting operation and signal receiving operation.

DETAILED DESCRIPTION

Hereinafter, a radio frequency circuit and a communication apparatus according to Embodiments 1 to 3 will be described with reference to the drawings.

Embodiment 1

The configuration of a radio frequency circuit 1 according to Embodiment 1 will be described with reference to the drawings.

Figure 2:
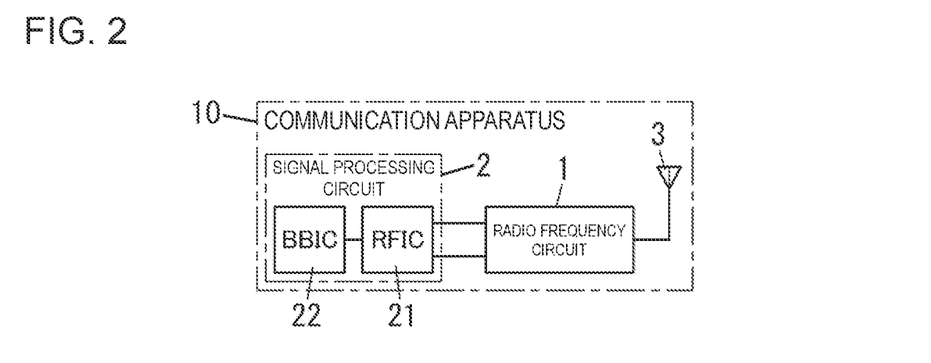
FIG. 2 is a schematic diagram of a communication apparatus according to Embodiment 1.

As illustrated in FIG. 2, the radio frequency circuit 1 is used, for example, for a communication apparatus 10. The communication apparatus 10 is a mobile phone such as a smartphone. The communication apparatus 10 is not limited to a mobile phone and may be a wearable terminal such as a smart watch. The radio frequency circuit 1 is a circuit, for example, that can support a fourth-generation mobile communication (4G) standard, and a fifth-generation mobile communication (5G) standard. The 4G standard is, for example, the third generation partnership project (3GPP, registered trademark) long term evolution (LTE, registered trademark) standard. The 5G standard is, for example, the 5G new radio (NR).

The communication apparatus 10, for example, receives a reception signal and transmits a transmission signal. For example, the communication apparatus 10 performs switching between transmission and reception on a time basis. The reception signal and the transmission signal in the same frequency band are time division duplex (TDD) signals. The TDD is wireless communication technology in which the same frequency band is assigned to transmission and reception in the wireless communication and switching between the transmission and the reception is performed on a time basis.

2 Circuit Configuration of Radio Frequency Circuit

The circuit configuration of the radio frequency circuit 1 according to Embodiment 1 will then be described with reference to FIG. 1.

Figure 1:
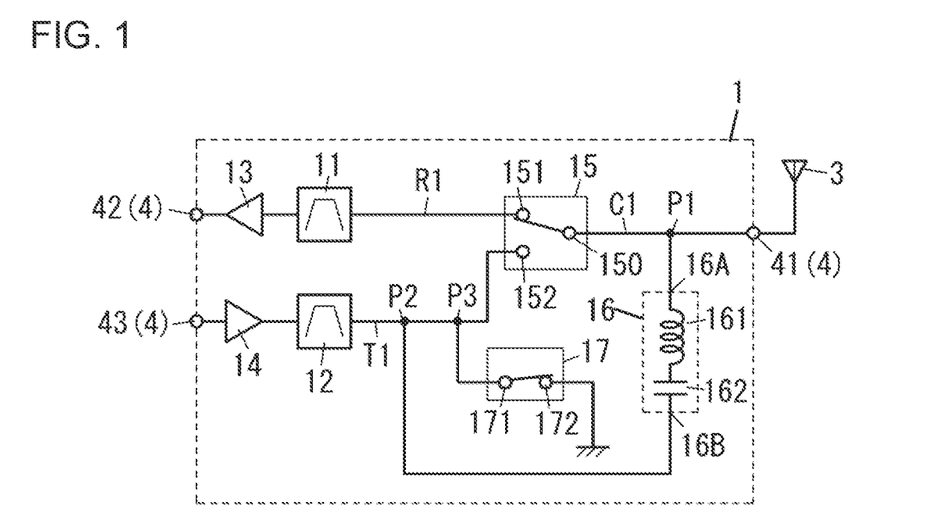
FIG. 1 is a circuit diagram of a radio frequency circuit according to Embodiment 1.

As illustrated in FIG. 1, the radio frequency circuit 1 according to Embodiment 1 includes a reception filter 11, a transmission filter 12, a low noise amplifier 13, and a power amplifier 14. The radio frequency circuit 1 according to Embodiment 1 further includes, a first switch 15, a regulator circuit 16, and a second switch 17. The radio frequency circuit 1 according to Embodiment 1 further includes a plurality of (three, in the illustrated example) external connection terminals 4. The plurality of external connection terminals 4 includes an antenna terminal 41, a signal output terminal 42, and a signal input terminal 43.

2.1 Reception Filter

The reception filter 11 is a filter that allows a reception signal to pass. The reception filter 11 is disposed between the low noise amplifier 13 and the first switch 15.

2.2 Transmission Filter

The transmission filter 12 is a filter that allows a transmission signal to pass. The transmission filter 12 is disposed between the power amplifier 14 and the first switch 15.

2.3 Low Noise Amplifier

The low noise amplifier 13 is an amplifier that amplifies the reception signal with low noise. The low noise amplifier 13 is disposed between the signal output terminal 42 and the reception filter 11.

The low noise amplifier 13 has an input terminal (not illustrated) and an output terminal (not illustrated). The input terminal of the low noise amplifier 13 is connected to the reception filter 11. The output terminal of the low noise amplifier 13 is connected to an external circuit (for example, a signal processing circuit 2) with the signal output terminal 42 interposed therebetween.

2.4 Power Amplifier

The power amplifier 14 is an amplifier that amplifies a transmission signal. The power amplifier 14 is disposed between the signal input terminal 43 and the transmission filter 12.

The power amplifier 14 has an input terminal (not illustrated) and an output terminal (not illustrated). The input terminal of the power amplifier 14 is connected to the 2) with the signal input terminal 43 interposed therebetween. The output terminal of the power amplifier 14 is connected to the transmission filter 12. The power amplifier 14 is controlled by, for example, a controller (not illustrated).

2.5 First Switch

The first switch 15 performs switching between filters each connected from a corresponding one of the reception filter 11 and the transmission filter 12 to the antenna terminal 41. Specifically, the first switch 15 is a switch for performing switching between paths connected to the antenna terminal 41. The first switch 15 has a common terminal 150 and a plurality of (two, in the illustrated example) selection terminals 151 and 152. The common terminal 150 is connected to the antenna terminal 41. Hereinafter, a signal path connected to the common terminal 150 of the first switch 15 is referred to as a common path C1. In the radio frequency circuit 1 according to Embodiment 1, the signal path between the common terminal 150 of the first switch 15 and the antenna terminal 41 is the common path C1. In the radio frequency circuit 1 according to Embodiment 1, the common path C1 is a first signal path.

The selection terminal 151 is connected to the reception filter 11. In the radio frequency circuit 1 according to Embodiment 1, the selection terminal 151 is a second selection terminal. Hereinafter, a signal path connected to the selection terminal 151 of the first switch 15 is referred to as a reception path R1. In the radio frequency circuit 1 according to Embodiment 1, the signal path between the selection terminal 151 of the first switch 15 and the reception filter 11 is the reception path R1.

The selection terminal 152 is connected to the transmission filter 12. In the radio frequency circuit 1 according to Embodiment 1, the selection terminal 152 is a first selection terminal. Hereinafter, a signal path connected to the selection terminal 152 of the first switch 15 is referred to as a transmission path T1. In the radio frequency circuit 1 according to Embodiment 1, a signal path between the selection terminal 152 of the first switch 15 and the transmission filter 12 is the transmission path T1. In the radio frequency circuit 1 according to Embodiment 1, the transmission path T1 is a second signal path.

The first switch 15 performs switching between the states of each of connections between the common terminal 150 and a corresponding one of the selection terminals 151 and 152. The first switch 15 is controlled, for example, by the signal processing circuit 2 (see FIG. 2). The first switch 15 electrically connects the common terminal 150 and one of the selection terminals 151 and 152 in accordance with a control signal from a RF signal processing circuit 21 (see FIG. 2) of the signal processing circuit 2.

2.6 Regulator Circuit

The regulator circuit 16 is disposed between the common path C1 and the transmission path T1. When the first switch 15 connects the common path C1 and the reception path R1, the regulator circuit 16 is connected between the common path C1 and the ground. When the first switch 15 connects the common path C1 and the reception path R1, the regulator circuit 16 functions as a filter for a reception signal transmitting through the common path C1. In the radio frequency circuit 1 according to Embodiment 1, when the first switch 15 connects the common path C1 and the reception path R1, the regulator circuit 16 is a notch filter that eliminates a component with a ½ frequency of that of the reception signal. For example, when the first switch 15 connects the common path C1 and the reception path R1, the regulator circuit 16 may be a circuit for impedance matching between the reception filter 11 and an antenna 3.

The regulator circuit 16 includes an inductor 161 and a capacitor 162. The inductor 161 and the capacitor 162 are connected in series. The configuration of the regulator circuit 16 is not limited to the configuration including one inductor and one capacitor and may be, for example, a configuration including one or more inductors or one or more capacitors. The regulator circuit 16 may include a plurality of inductors and a plurality of capacitors.

A first end 16A of the regulator circuit 16 is connected to a connecting point P1 of the common path C1. The connecting point P1 is directly connected to the common terminal 150 of the first switch 15. The phrase "the connecting point P1 is directly connected to the common terminal 150 of the first switch 15" denotes that a circuit device is not disposed between the connecting point P1 and the common terminal 150 of the first switch 15 in the common path C1. A second end 16B of the regulator circuit 16 is a connecting point P2 of the transmission path T1.

2.7 Second Switch

The second switch 17 performs switching of the state of connection between the transmission path T1 and the ground. Specifically, the second switch 17 is a switch for switching of whether to connect the transmission path T1 to the ground. The second switch 17 has a first terminal 171 and a second terminal 172.

The first terminal 171 of the second switch 17 is connected to a connecting point P3 of the transmission path T1. The connecting point P2 is directly connected to the selection terminal 152 of the first switch 15. The phrase "the connecting point P2 is directly connected to the selection terminal 152 of the first switch 15" denotes that a circuit device is not disposed between the connecting point P2 and the selection terminal 152 of the first switch 15 in the transmission path T1. The connecting point P2 is directly connected to the connecting point P3. That is, the circuit device is not disposed between the connecting point P2 and the connecting point P3 in the transmission path T1.

The second terminal 172 is connected to the ground.

The second switch 17 performs switching between the states of each of connections to a corresponding one of the first terminal 171 and the second terminal 172. In more detail, when the common terminal 150 of the first switch 15 is connectable to the selection terminal 151, the first terminal 171 and the second terminal 172 of the second switch 17 are connectable. When the common terminal 150 of the first switch 15 is connectable to the selection terminal 152, the first terminal 171 and the second terminal 172 of the second switch 17 are not connectable. The second switch 17 is controlled by, for example, the signal processing circuit 2 (see FIG. 2). In the second switch 17, depending on a control signal from the RF signal processing circuit 21 (see FIG. 2) of the signal processing circuit 2, the first terminal 171 and the second terminal 172 are electrically connectable or are not connectable.

2.8 External Connection Terminals

The external connection terminals 4 are terminals for electrically connecting to the external circuit (for example, the signal processing circuit 2). The external connection terminals 4 include the antenna terminal 41, the signal output terminal 42, the signal input terminal 43, a plurality of control terminals (not illustrated), and a plurality of ground terminals (not illustrated).

The antenna 3 is connected to the antenna terminal 41. In the radio frequency circuit 1, the antenna terminal 41 is connected to the first switch 15 with the common path C1 interposed therebetween. The antenna terminal 41 is connected to the reception filter 11 with the first switch 15 and the reception path R1 interposed therebetween. Further, the antenna terminal 41 is connected to the transmission filter 12 with the first switch 15 and the transmission path T1 interposed therebetween.

The signal output terminal 42 is a terminal for outputting, to the external circuit (for example, the signal processing circuit 2), a reception signal from the radio frequency circuit 1. In the radio frequency circuit 1, the low noise amplifier 13 is connected to the signal output terminal 42.

The signal input terminal 43 is a terminal for inputting, to the radio frequency circuit 1, a transmission signal from the external circuit (for example, the signal processing circuit 2). In the radio frequency circuit 1, the power amplifier 14 is connected to the signal input terminal 43.

The control terminals are terminals for inputting, to the radio frequency circuit 1, a control signal from the 2). In the radio frequency circuit 1, the control terminals are connected to the controller (not illustrated).

The ground terminals are terminals that are electrically connected to the ground electrode of an external board (not illustrated) of the communication apparatus 10 and that are given a ground potential. In the radio frequency circuit 1, the ground terminals are connected to a ground layer (not illustrated) of a mounting substrate (described later but not illustrated).

3 Structure of Radio Frequency Circuit

The structure of the radio frequency circuit 1 according to Embodiment 1 will then be described.

The radio frequency circuit 1 includes the mounting substrate (not illustrated) and a plurality of electronic components (not illustrated). The radio frequency circuit 1 includes, as the electronic components, the reception filter 11, the transmission filter 12, the low noise amplifier 13, the power amplifier 14, the first switch 15, the inductor 161, the capacitor 162, and the second switch 17. The radio frequency circuit 1 may include an IC chip as one of the electronic components, instead of the first switch 15 and the second switch 17. The IC chip includes the first switch 15 and the second switch 17.

The radio frequency circuit 1 is electrically connectable to the external board (not illustrated). The external board corresponds to the mother board of the communication apparatus 10 such as a mobile phone or a communication apparatus. The phrase "the radio frequency circuit 1 is electrically connectable to the external board" includes not only a case where the radio frequency circuit 1 is directly mounted on the external board but also a case where the radio frequency circuit 1 is indirectly mounted on the external board. The case where the radio frequency circuit 1 is indirectly mounted on the external board is, for example, a case that the radio frequency circuit 1 is indirectly mounted on a different radio frequency circuit mounted on the external board.

3.1 Mounting Substrate

The mounting substrate has a first main surface and a second main surface. The first main surface and the second main surface face each other in the thickness direction of the mounting substrate. In a case where the radio frequency circuit 1 is provided on the external board, the second main surface faces a main surface on the mounting substrate side in the external board. The mounting substrate is a single-sided mounting substrate in which the electronic components are mounted, for example, on the first main surface. The mounting substrate is not limited to the single-sided mounting substrate and may be a double-sided mounting substrate in which the electronic components are mounted on the first main surface and the second main surface.

The mounting substrate is a multi-layer substrate in which a plurality of dielectric layers are laminated. The mounting substrate has a plurality of conductive layers and a plurality of via conductors (through-hole electrodes). The conductive layers include the ground layer having a ground potential. The via conductors are used for the electrical connection between elements mounted on the first main surface of the mounting substrate (including the electronic components above) and the conductive layers of the mounting substrate.

The via conductors are used for electrical connection between the external connection terminal 4 and the conductive layers of the mounting substrate.

On the first main surface of the mounting substrate, the electronic components are disposed. On the second main surface of the mounting substrate, the external connection terminals 4 are disposed.

3.2 Electronic Components

The electronic components are disposed on the first main surface of the mounting substrate. In more detail, the electronic components are mounted on the first main surface of the mounting substrate. Some of the electronic components may be mounted on the first main surface of the mounting substrate, and the other electronic components may be mounted in the mounting substrate. In short, the electronic components are disposed on the first main surface side of the mounting substrate rather than the second main surface side, and at least include the electronic components disposed on the first main surface.

3.3 External Connection Terminals

The external connection terminals 4 are terminals for electrically connecting the mounting substrate (not illustrated) and the external board (not illustrated).

The external connection terminals 4 are disposed on the second main surface of the mounting substrate. The external connection terminals 4 are each a pillar-shaped (for example, columnar) electrode disposed on the second main surface of the mounting substrate. The material of the external connection terminals 4 is, for example, a metal (such as copper or a copper alloy).

4 Communication Apparatus

As illustrated in FIG. 2, the communication apparatus 10 includes the radio frequency circuit 1, the signal processing circuit 2, and the antenna 3. The communication apparatus 10 further includes the external board (not illustrated) on which the radio frequency circuit 1 is mounted. The external board is, for example, a printed-circuit board. The external board has a ground electrode given the ground potential.

4.1 Antenna

As illustrated in FIGS. 1 and 2, the antenna 3 is connected to the antenna terminal 41 of the radio frequency circuit 1. The antenna 3 has a transmitting function and a receiving function. In the transmitting function, a transmission signal output from the radio frequency circuit 1 is emitted as a radio wave. In the receiving function, reception signal is received as a radio wave from outside, and the reception signal is output to the radio frequency circuit 1.

4.2 Signal Processing Circuit

As illustrated in FIG. 2, the signal processing circuit 2 includes the RF signal processing circuit 21 and a baseband signal processing circuit 22. The signal processing circuit 2 processes signals passing through the radio frequency circuit 1. In more detail, the signal processing circuit 2 processes a transmission signal and a reception signal.

The RF signal processing circuit 21 is, for example, a radio frequency integrated circuit (RFIC). The RF signal processing circuit 21 performs signal processing of a radio frequency signal.

The RF signal processing circuit 21 performs signal processing such as the upconverting of a transmission signal output from the baseband signal processing circuit 22 and outputs the transmission signal subjected to the signal processing to the radio frequency circuit 1. The RF signal processing circuit 21 performs signal processing such as the downconverting of a reception signal output from the radio frequency circuit 1 and outputs the reception signal subjected to the signal processing to the baseband signal processing circuit 22.

The baseband signal processing circuit 22 is, for example, a baseband integrated circuit (BBIC). The baseband signal processing circuit 22 performs predetermined signal processing of a transmission signal from outside the signal processing circuit 2. A reception signal processed in the baseband signal processing circuit 22 is used as, for example, an image signal for image displaying or a voice signal for calling.

The RF signal processing circuit 21 has a function as a controller unit that controls connection of the first switch 15 and the second switch 17 of the radio frequency circuit 1 based on the transmission and reception of radio frequency signals (a transmission signal and a reception signal). Specifically, the RF signal processing circuit 21 performs switching between respective connections of the first switch 15 and the second switch 17 of the radio frequency circuit 1 in accordance with the control signal (not illustrated). The controller unit may be disposed outside the RF signal processing circuit 21, for example, in the radio frequency circuit 1 or the baseband signal processing circuit 22.

5 Operation of Radio Frequency Circuit

The operation of the radio frequency circuit 1 according to Embodiment 1 will then be described with reference to FIGS. 1 and 3.

As illustrated in FIG. 1, in the radio frequency circuit 1 according to Embodiment 1, in the receiving operation, the common terminal 150 and the selection terminal 151 of the first switch 15 are connected. In addition, as illustrated in FIG. 1, in the radio frequency circuit 1 according to Embodiment 1, in the receiving operation, the first terminal 171 and the second terminal 172 of the second switch 17 are connected. Accordingly, in the radio frequency circuit 1 according to Embodiment 1, in the receiving operation, the common path C1 and the reception path R1 are electrically connected with the first switch 15 interposed therebetween.

In the radio frequency circuit 1 according to Embodiment 1, in the receiving operation, the transmission path T1 is also connected to the ground with the second switch 17 interposed therebetween.

Further, in the radio frequency circuit 1 according to Embodiment 1, in the receiving operation, the second end 16B of the regulator circuit 16 is connected to the ground with the transmission path T1 and the second switch 17 interposed therebetween. The connecting point P2 and the connecting point P3 are directly connected on the transmission path T1 as described above. That is, when the common terminal 150 and the selection terminal 151 are connectable in the radio frequency circuit 1, the second switch 17 causes the transmission path T1 and the ground to be connectable. The second end 16B of the regulator circuit 16 thus enters into a state of direct connection to the ground. That is, in the radio frequency circuit 1 according to Embodiment 1, in the receiving operation, the regulator circuit 16 is connected between the common path C1 and the ground.

Accordingly, in the receiving operation, the radio frequency circuit 1 according to Embodiment 1 may cause the regulator circuit 16 to function as a matching circuit, the filter circuit, or the matching circuit and the filter circuit. In the radio frequency circuit 1 according to Embodiment 1, in the receiving operation, the regulator circuit 16 may thus function as the notch filter that eliminates the component with a ½ frequency of that of the reception signal input from the antenna 3. If a second-order harmonic having a component with a ½ frequency of that of the reception signal is generated in the first switch 15, the second-order harmonic could be noise in the same band as that of the reception signal. However, according to the radio frequency circuit 1 according to Embodiment 1, the regulator circuit 16 may reduce the component with the ½ frequency of that of the reception signal before the reception signal transmits to the first switch 15, and thus the deterioration of the signal to noise (S/N) ratio of the reception signal may be reduced. Accordingly, in the receiving operation, the radio frequency circuit 1 according to Embodiment 1 may improve the S/N ratio of the reception signal. In the radio frequency circuit 1 according to Embodiment 1, in the receiving operation, impedance matching between, for example, the antenna 3 and the reception filter 11 may thus be performed by using the regulator circuit 16.

Figure 3:
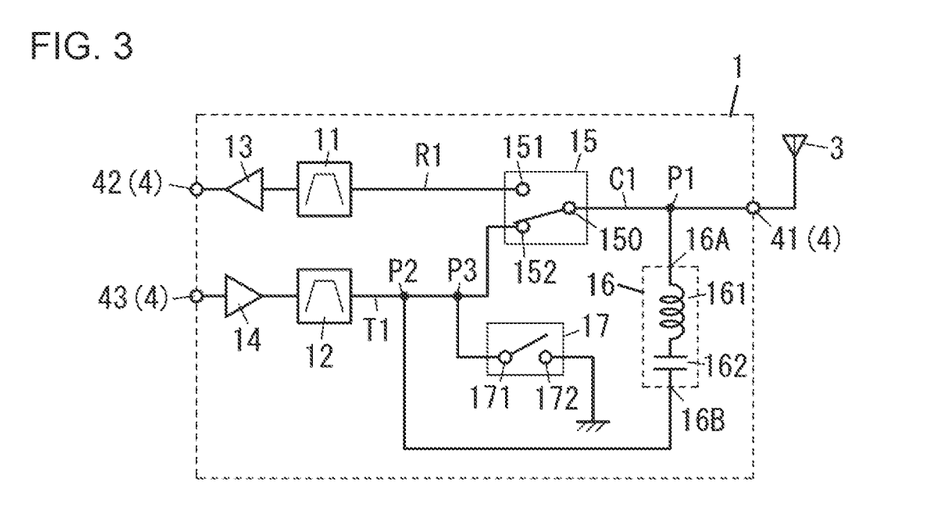
FIG. 3 is a circuit diagram illustrating the transmitting operation of the radio frequency circuit above.

In contrast, in the radio frequency circuit 1 according to Embodiment 1, in the transmitting operation, the common terminal 150 and the selection terminal 152 of the first switch 15 are connected as illustrated in FIG. 3. In the radio frequency circuit 1 according to Embodiment 1, in the transmitting operation, the first terminal 171 and the second terminal 172 of the second switch 17 are disconnected from each other as illustrated in FIG. 3. That is, when the common terminal 150 and the selection terminal 152 are connectable in the radio frequency circuit 1, the second switch 17 does not cause the transmission path T1 and the ground to be connectable. Accordingly, in the radio frequency circuit 1 according to Embodiment 1, in the transmitting operation, the common path C1 and the transmission path T1 are electrically connected with the first switch 15 interposed therebetween. In the radio frequency circuit 1 according to Embodiment 1, in the transmitting operation, loss due to the leakage of a transmission signal to the ground may be reduced.

In the radio frequency circuit 1 according to Embodiment 1, in the transmitting operation, the first switch 15 and the regulator circuit 16 enter into a state of parallel connection in the path between the transmission filter 12 and the antenna terminal 41. The connecting point P3 is directly connected to the selection terminal 152 of the first switch 15 as described above. That is, the impedance of the path reaching the connecting point P1 of the common path C1 from the connecting point P2 of the transmission path T1 via the first switch 15 is equal to the impedance between the selection terminal 152 and the common terminal 150 of the first switch 15. The impedance of the path reaching the connecting point P1 of the common path C1 from the connecting point P2 of the transmission path T1 via the first switch 15 is equal to the impedance of the regulator circuit 16. Accordingly, in the transmitting operation, the radio frequency circuit 1 according to Embodiment 1 enters into a state where the first switch 15 and the regulator circuit 16 are connected in parallel between the connecting point P2 of the transmission path T1 and the connecting point P1 of the common path C1. Since the impedance of the first switch 15 is sufficiently lower than the impedance of the regulator circuit 16, the first switch 15 functions as a short-circuit path on behalf of the regulator circuit 16 in the transmitting operation in the radio frequency circuit 1 according to Embodiment 1.

Accordingly, in the radio frequency circuit 1 according to Embodiment 1, observed from the connecting point P1, the impedance of the regulator circuit 16 is closer to that in the open state in the transmitting operation than in the receiving operation. In other words, in the radio frequency circuit 1 according to Embodiment 1, the impedance of the regulator circuit 16 observed from the connecting point P1 is closer to that in the open state when the common terminal 150 and the selection terminal 152 are connectable than when the common terminal 150 and the selection terminal 151 are connectable. That is, in the radio frequency circuit 1 according to Embodiment 1, in the transmitting operation, the transmission signal is difficult to transmit to the regulator circuit 16. Accordingly, if the regulator circuit 16 is the notch filter that eliminates the component with the ½ frequency of that of the reception signal, it is difficult to hinder the transmission signal transmission in the transmitting operation. Accordingly, in the radio frequency circuit 1 according to Embodiment 1, in the transmitting operation, the signal loss of the transmission signal may be reduced. In addition, for example, if the regulator circuit 16 functions as a matching circuit, the transmission signal is difficult to transmit to the regulator circuit 16 in the transmitting operation of the radio frequency circuit 1. Accordingly, in the radio frequency circuit 1 according to Embodiment 1, in the transmitting operation, the regulator circuit 16 is less likely to influence the impedance matching between the transmission filter 12 and the antenna 3. Accordingly, for example, even when the impedance of the transmission filter 12 is different from that of the reception filter 11, the impedance matching between the antenna 3 and the reception filter 11 and the impedance matching between the transmission filter 12 and the antenna 3 may both be achieved easily.

6 Effects

The radio frequency circuit 1 according to Embodiment 1 includes the antenna terminal 41, the first switch 15, the power amplifier 14, the low noise amplifier 13, the regulator circuit 16, and the second switch 17. The first switch 15 has the common terminal 150, the selection terminal 152 (first selection terminal), and the selection terminal 151 (second selection terminal). The common terminal 150 is connected to the antenna terminal 41. The selection terminal 152 is connectable to the common terminal 150. The selection terminal 151 is connectable to the common terminal 150. The power amplifier 14 is connected to the selection terminal 152. The low noise amplifier 13 is connected to the selection terminal 151. The regulator circuit 16 is connected between the common path C1 and the transmission path T1, the common path C1 being between the antenna terminal 41 and the common terminal 150, the transmission path T1 being between the power amplifier 14 and the selection terminal 152. The second switch 17 is connected between the transmission path T1 and the ground. The regulator circuit 16 includes the inductor 161 and the capacitor 162.

In the radio frequency circuit 1 according to Embodiment 1, when the reception path R1 and the common path C1 are connected, the regulator circuit 16 is connectable between the common path C1 and the ground with the second switch 17 interposed therebetween. Accordingly, when the reception path R1 is used, the regulator circuit 16 may be operated. In contrast, when the transmission path T1 and the common path C1 are connected, the first switch 15 and the regulator circuit 16 are connected in parallel. The first switch 15 thus functions as the short-circuit path on behalf of the regulator circuit 16. Accordingly, the circuit characteristics of the radio frequency circuit 1 may be achieved in both of communication using the transmission path T1 and communication using the reception path R1. In particular in the radio frequency circuit 1 according to Embodiment 1, in the receiving operation, the impedance matching between the antenna 3 and the reception filter 11 may be optimized, and providing the filter circuit on the common path C1 may improve the S/N ratio of a reception signal.

In the radio frequency circuit 1 according to Embodiment 1, in the transmitting operation, the first switch 15 causes the common terminal 150 and the selection terminal 152 to be connected, and the second switch 17 causes the transmission path T1 and the ground not to be connected. Further, the connecting point P3, of the second switch 17, in contact with the transmission path T1 is directly connected to the selection terminal 152 of the first switch 15. This causes the first switch 15 and the regulator circuit 16 to be connected in parallel in the transmitting operation. However, the impedance of the first switch 15 is sufficiently lower than the impedance of the regulator circuit 16, and thus the first switch 15 serves as the short-circuit path on behalf of the regulator circuit 16. Accordingly, in the radio frequency circuit 1 according to Embodiment 1, observed from the connecting point P1, the impedance of the regulator circuit 16 becomes closer to that in the open state in the transmitting operation than in the receiving operation. That is, in the radio frequency circuit 1 according to Embodiment 1, in the transmitting operation, the impedance matching between the antenna 3 and the transmission filter 12 may be optimized with the influence of the regulator circuit 16 being reduced. In the radio frequency circuit 1 according to Embodiment 1, in the transmitting operation, the loss of a transmission signal due to the presence, on the common path C1, of the regulator circuit 16 serving as the filter circuit may be reduced.

The radio frequency circuit 1 according to Embodiment 1 may include an IC chip, instead of the first switch 15 and the second switch 17, the IC chip including the first switch 15 and the second switch 17. Integrating the first switch 15 and the second switch 17 into a single electronic component thus enables the radio frequency circuit be downsized. Physically disposing the selection terminal 152 of the first switch 15 closer to the first terminal 171 of the second switch 17 easily enables the connecting point P3, of the second switch 17, in contact with the transmission path T1 to be directly connected to the selection terminal 152 of the first switch 15.

7 Modifications

Hereinafter, modifications of Embodiment 1 are enumerated.

The regulator circuit 16 includes the inductor 161 and the capacitor 162 that are connected in series in Embodiment 1; however, the regulator circuit 16 may be a circuit, for example, in the following modifications.

Figure 4A:
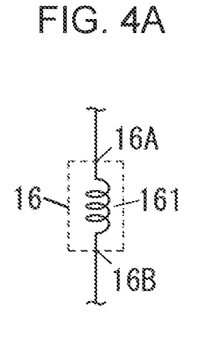
FIG. 4A is a circuit diagram of the regulator circuit used for a radio frequency circuit according to Modification 1 of Embodiment 1.
Figure 4B:
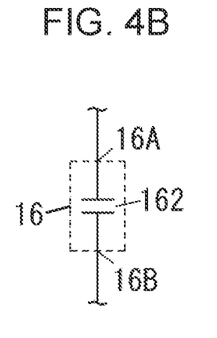
FIG. 4B is a circuit diagram of the regulator circuit used for a radio frequency circuit according to Modification 2 of Embodiment 1.
Figure 4C:
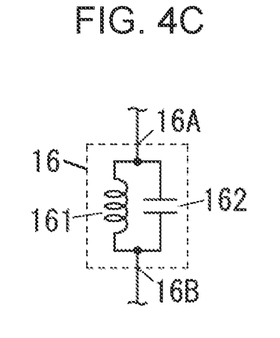
FIG. 4C is a circuit diagram of the regulator circuit used for a radio frequency circuit according to Modification 3 of Embodiment 1.

In Modification 1, the regulator circuit 16 includes the inductor 161 as illustrated in FIG. 4A. In Modification 2, the regulator circuit 16 includes the capacitor 162 as illustrated in FIG. 4B. In Modification 3, the regulator circuit 16 includes the inductor 161 and the capacitor 162 that are connected in parallel as illustrated in FIG. 4C. Even if the regulator circuit 16 has the configuration as above, the impedance matching between the antenna 3 and the reception filter 11 may be optimized by using the regulator circuit 16 in the receiving operation. In addition, in the transmitting operation, the impedance matching between the antenna 3 and the transmission filter 12 may be optimized with the influence of the regulator circuit 16 being reduced. The regulator circuit 16 may function as the matching circuit, as the filter circuit, or one of the matching circuit and the filter circuit. Accordingly, it suffices that the regulator circuit 16 includes at least one of the inductor 161 and the capacitor 162.

Embodiment 2

A radio frequency circuit 1A according to Embodiment 2 will be described with reference to FIG. 5. The same components of the radio frequency circuit 1A according to Embodiment 2 as those in the radio frequency circuit 1 according to Embodiment 1 (see FIG. 1) are denoted by the same reference numerals, and the description thereof is omitted.

1 Circuit Configuration of Radio Frequency Circuit

Figure 5:
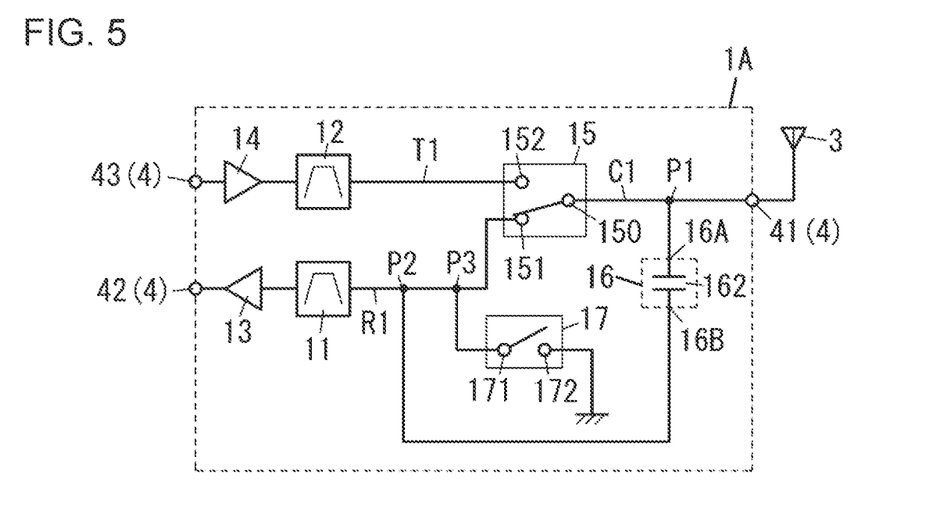
FIG. 5 is a circuit diagram of a radio frequency circuit according to Embodiment 2.

In the radio frequency circuit 1A according to Embodiment 2, as illustrated in FIG. 5, the second end 16B of the regulator circuit 16 and the first terminal 171 of the second switch 17 are connected to the reception path R1. That is, in the radio frequency circuit 1A according to Embodiment 2, the reception path R1 is the second signal path. In the radio frequency circuit 1A according to Embodiment 2, the selection terminal 151 of the first switch 15 is the first selection terminal. In the radio frequency circuit 1A according to Embodiment 2, the selection terminal 152 of the first switch 15 is the second selection terminal.

In the radio frequency circuit 1A according to Embodiment 2, the regulator circuit 16 includes the capacitor 162. As illustrated in FIG. 5, the second end 16B of the regulator circuit 16 is connected to the connecting point P2 of the reception path R1.

In the radio frequency circuit 1A according to Embodiment 2, the first terminal 171 of the second switch 17 is connected to the connecting point P3 of the reception path R1. The connecting point P3 of the reception path R1 is directly connected to the selection terminal 151 of the first switch 15. In other words, a circuit device is not disposed between the connecting point P2 and the selection terminal 151 of the first switch 15 in the reception path R1. The connecting point P3 of the reception path R1 is directly connected to the connecting point P2 of the reception path R1. In other words, the circuit device is not disposed between the connecting point P2 and the connecting point P3 in the reception path R1.

When the common terminal 150 of the first switch 15 is connected to the selection terminal 152, the first terminal 171 and the second terminal 172 of the second switch 17 are connected in the second switch 17. That is, when the common terminal 150 and the selection terminal 152 are connectable in the radio frequency circuit 1A, the second switch 17 causes the reception path R1 and the ground to be connectable. When the common terminal 150 of the first switch 15 is connected to the common terminal 150 of the first switch 15, the first terminal 171 and the second terminal 172 of the second switch 17 are disconnected from each other. That is, when the common terminal 150 and the selection terminal 151 are connectable in the radio frequency circuit 1A, the second switch 17 does not cause the reception path R1 and the ground to be connectable.

2 Operation of Radio Frequency Circuit

In the radio frequency circuit 1A according to Embodiment 2, in the transmitting operation, the common terminal 150 and the selection terminal 152 of the first switch 15 are connected. In the radio frequency circuit 1A according to Embodiment 2, in the transmitting operation, the first terminal 171 and the second terminal 172 of the second switch 17 are connected. Accordingly, in the transmitting operation, the common path C1 and the transmission path T1 are electrically connected with the first switch 15 interposed therebetween.

In the radio frequency circuit 1A according to Embodiment 2, in the transmitting operation, the reception path R1 and the second end 16B of the regulator circuit 16 are connected to the ground, likewise in the receiving operation of the radio frequency circuit 1 according to Embodiment 1. Accordingly, in the radio frequency circuit 1A according to Embodiment 2, in the transmitting operation, the regulator circuit 16 may function as the matching circuit, the filter circuit, or the matching circuit and the filter circuit. In the radio frequency circuit 1A according to Embodiment 2, in the transmitting operation, the regulator circuit 16 may perform the impedance matching, for example, between the antenna 3 and the transmission filter 12. In the radio frequency circuit 1A according to Embodiment 2, in the transmitting operation, the regulator circuit 16 may function as a low-pass filter (LPF) that eliminates, for example, a second-order harmonic and a third-order harmonic of a transmission signal. In a case where the second-order harmonic or the third-order harmonic of the transmission signal is generated in the first switch 15, the transmission of the second-order harmonic or the third-order harmonic of the transmission signal from the antenna 3 may thus be reduced.

In contrast, in the radio frequency circuit 1A according to Embodiment 2, in the receiving operation, the common terminal 150 and the selection terminal 151 of the first switch 15 are connected as illustrated in FIG. 5. In the radio frequency circuit 1 according to Embodiment 2, in the receiving operation, the first terminal 171 and the second terminal 172 of the second switch 17 are disconnected from each other as illustrated in FIG. 5. Accordingly, in the radio frequency circuit 1A according to Embodiment 2, in the receiving operation, the common path C1 and the reception path R1 are electrically connected with the first switch 15 interposed therebetween. In the radio frequency circuit 1A according to Embodiment 2, in the receiving operation, loss due to the leakage of a reception signal to the ground may be reduced.

In the radio frequency circuit 1A according to Embodiment 2, in the receiving operation, the first switch 15 and the regulator circuit 16 enter into a state of parallel connection in the path between the reception filter 11 and the antenna terminal 41. However, in the radio frequency circuit 1A according to Embodiment 2, in the receiving operation, the first switch 15 functions as the short-circuit path on behalf of the regulator circuit 16. Accordingly, in the state of the radio frequency circuit 1A according to Embodiment 2, the impedance of the regulator circuit 16 observed from the connecting point P1 becomes closer to that in the open state in the receiving operation than in the transmitting operation. In other words, in the radio frequency circuit 1A according to Embodiment 2, the impedance of the regulator circuit 16 observed from the connecting point P1 is closer to that in the open state when the common terminal 150 and the selection terminal 151 (first selection terminal) are connectable than when the common terminal 150 and the selection terminal 152 (second selection terminal) are connectable. That is, in the radio frequency circuit 1A, in the receiving operation, the reception signal is difficult to transmit to the regulator circuit 16. Accordingly, for example, in the receiving operation, the regulator circuit 16 is less likely to influence the impedance matching between the antenna 3 and the reception filter 11. For example, even when the impedance differs between the transmission filter 12 and the reception filter 11, the impedance matching between the antenna 3 and the reception filter 11 and the impedance matching between the transmission filter 12 and the antenna 3 may thus both be achieved easily. In addition, for example, if the regulator circuit 16 is the LPF that eliminates the second-order harmonic and the third-order harmonic of the transmission signal, the hindering of the transmission of the reception signal through the common path C1 by the regulator circuit 16 is reduced. Accordingly, in the radio frequency circuit 1A according to Embodiment 2, in the receiving operation, the loss of the reception signal may be reduced.

3 Modification

The modification of a radio frequency circuit 1B according to Embodiment 2 will be described with reference to FIG. 6. The same components of the radio frequency circuit 1B according to the modification of Embodiment 2 as those of the radio frequency circuit 1 according to Embodiment 1 (see FIG. 1) or the radio frequency circuit 1A according to Embodiment 2 (see FIG. 5) are denoted by the same reference numerals, and the description thereof is omitted.

Figure 6:
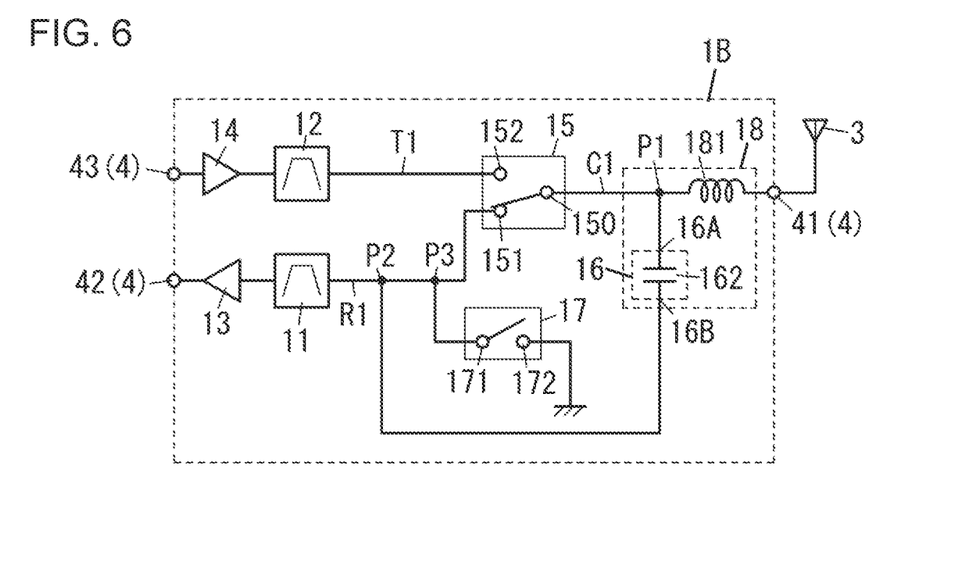
FIG. 6 is a circuit diagram of a radio frequency circuit according to a modification of Embodiment 2.

In the radio frequency circuit 1B according to the modification of Embodiment 2, as illustrated in FIG. 6, a circuit device 181 is disposed between the connecting point P1 and the antenna terminal 41 on the common path C1. The circuit device 181 is, for example, an inductor.

In the radio frequency circuit 1B, in the transmitting operation, the common terminal 150 and the selection terminal 152 of the first switch 15 are connected. In the radio frequency circuit 1B, in the transmitting operation, the first terminal 171 and the second terminal 172 of the second switch 17 are connected. Accordingly, in the transmitting operation, the common path C1 and the transmission path T1 are electrically connected with the first switch 15 interposed therebetween.

In the radio frequency circuit 1B, in the transmitting operation, the reception path R1 and the second end 16B of the regulator circuit 16 are connected to the ground. In other words, when the common terminal 150 and the selection terminal 152 are connectable in the radio frequency circuit 1B, the second switch 17 causes the reception path R1 and the ground to be connectable. Accordingly, in the radio frequency circuit 1B, in the transmitting operation, the circuit device 181 and the regulator circuit 16 function as a filter circuit 18 that is the LPF. In the radio frequency circuit 1B, in the transmitting operation, outputting, from the antenna 3, of, for example, the second-order harmonic and the third-order harmonic of the transmission signal that are likely to be generated in the first switch 15 may thus be reduced.

In contrast, in the radio frequency circuit 1B, as illustrated in FIG. 6, in the receiving operation, the common terminal 150 and the selection terminal 151 of the first switch 15 are connected. In the radio frequency circuit 1B, in the receiving operation, the first terminal 171 and the second terminal 172 of the second switch 17 are disconnected from each other as illustrated in FIG. 6. In other words, when the common terminal 150 and the selection terminal 151 are connectable in the radio frequency circuit 1B, the second switch 17 does not cause the reception path R1 and the ground to be connectable. Accordingly, in the radio frequency circuit 1B, in the receiving operation, the common path C1 and the reception path R1 are electrically connected with the first switch 15 interposed therebetween.

In the radio frequency circuit 1B, in the receiving operation, the first switch 15 and the regulator circuit 16 enter into a state of parallel connection in the path between the reception filter 11 and the antenna terminal 41. However, in the radio frequency circuit 1B, in the receiving operation, the first switch 15 functions as the short-circuit path on behalf of the regulator circuit 16. Accordingly, in the radio frequency circuit 1B, in the receiving operation, the reception signal is difficult to transmit to the regulator circuit 16. In the radio frequency circuit 1B, in the receiving operation, the filter circuit 18 thus has characteristics closer to the characteristics of the circuit device 181 alone than to the characteristics of the LPF. In the radio frequency circuit 1B, in the receiving operation, the loss of the reception signal due to the filter circuit 18 may be reduced.

Embodiment 3

A radio frequency circuit 1C according to Embodiment 3 will be described with reference to FIG. 7. The same components of the radio frequency circuit 1C according to Embodiment 3 as those in the radio frequency circuit 1 according to Embodiment 1 (see FIG. 1) are denoted by the same reference numerals, and the description thereof is omitted.

Figure 7:
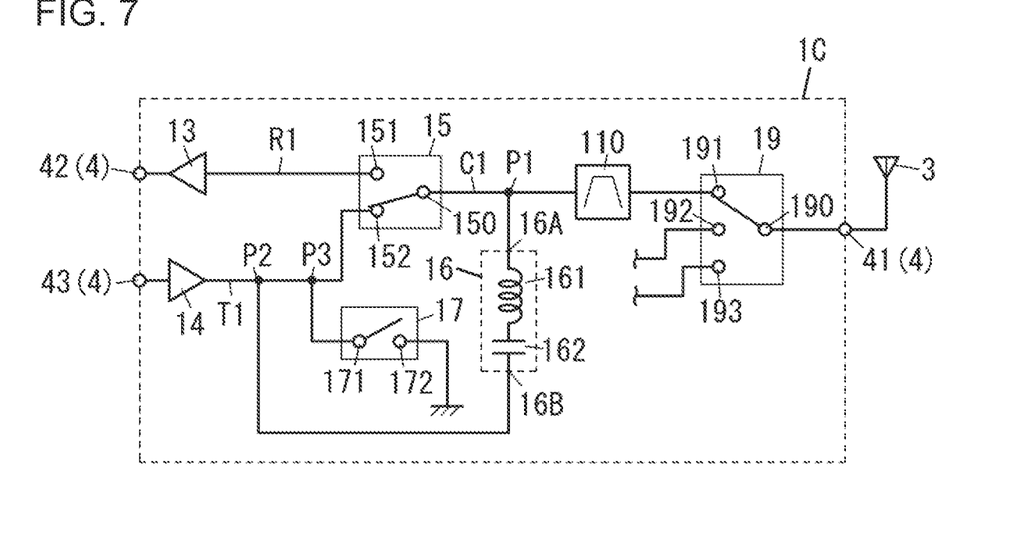
FIG. 7 is a circuit diagram of a radio frequency circuit according to Embodiment 3.

In the radio frequency circuit 1C according to Embodiment 3, as illustrated in FIG. 7, an antenna switch 19 is disposed between the antenna terminal 41 and the common terminal 150 of the first switch 15. As illustrated in FIG. 7, the radio frequency circuit 1C according to Embodiment 3 includes a transmission/reception filter 110 disposed between the antenna switch 19 and the common terminal 150 of the first switch 15, instead of the reception filter 11 and the transmission filter 12.

The antenna switch 19 is a switch for performing switching between paths connected to the antenna terminal 41. The antenna switch 19 has a common terminal 190 and a plurality of (three, in the illustrated example) selection terminals 191, 192, and 193. The common terminal 190 is connected to the antenna terminal 41.

The selection terminal 191 is connected to the transmission/reception filter 110.

The selection terminal 192 is connected to a filter (not illustrated) that allows a reception signal (hereinafter, referred to as a second reception signal) different from a reception signal (hereinafter, referred to as a first reception signal) that passes through the transmission/reception filter 110. The selection terminal 193 is connected to a filter (not illustrated) that allows a transmission signal (hereinafter, referred to as a second transmission signal) in a frequency band different from that of a transmission signal (hereinafter, referred to as a first transmission signal) that passes through the transmission/reception filter 110.

The transmission/reception filter 110 is a filter that allows the first reception signal and the first transmission signal to pass.

The transmission/reception filter 110 is disposed between the selection terminal 191 of the antenna switch 19 and the common terminal 150 of the first switch 15. In the radio frequency circuit 1C according to Embodiment 3, a communication path connecting the transmission/reception filter 110 and the common terminal 150 of the first switch 15 serves as the common path C1. In the radio frequency circuit 1C according to Embodiment 3, the common path C1 is a transmission/reception circuit.

In the radio frequency circuit 1C according to Embodiment 3, the low noise amplifier 13 is connected to the selection terminal 151 of the first switch 15. Accordingly, a communication path connecting the low noise amplifier 13 and the selection terminal 151 of the first switch 15 serves as the reception path R1. In the radio frequency circuit 1C according to Embodiment 3, the selection terminal 151 of the first switch 15 is the second selection terminal.

In the radio frequency circuit 1C according to Embodiment 3, the power amplifier 14 is connected to the selection terminal 152 of the first switch 15. Accordingly, a communication path connecting the power amplifier 14 and the selection terminal 152 of the first switch 15 serves as the transmission path T1. The second end 16B of the regulator circuit 16 is connected to the connecting point P2 of the transmission path T1. The second switch 17 is connected to the connecting point P3 of the transmission path T1. In the radio frequency circuit 1C according to Embodiment 3, the transmission path T1 is the second signal path. In the radio frequency circuit 1C according to Embodiment 3, the selection terminal 152 of the first switch 15 is the first selection terminal.

In the radio frequency circuit 1C according to Embodiment 3, in the receiving operation for the first reception signal, the common terminal 190 and the selection terminal 191 of the antenna switch 19 are connected. The common terminal 150 and the selection terminal 151 of the first switch 15 are also connected. Accordingly, in the radio frequency circuit 1C according to Embodiment 3, in the receiving operation for the first reception signal, the antenna terminal 41 and the reception path R1 are electrically connected with the antenna switch 19, the transmission/reception filter 110, and the first switch 15 interposed therebetween.

In the radio frequency circuit 1C according to Embodiment 3, in the receiving operation for the first reception signal, the first terminal 171 and the second terminal 172 of the second switch 17 are connected. Accordingly, in the radio frequency circuit 1C according to Embodiment 3, in the receiving operation for the first reception signal, the regulator circuit 16 is connected between the common path C1 and the ground. In other words, when the common terminal 150 and the selection terminal 151 are connectable in the radio frequency circuit 1C, the second switch 17 causes the transmission path T1 and the ground to be connectable. Accordingly, in the radio frequency circuit 1C according to Embodiment 3, in the receiving operation for the first reception signal, the regulator circuit 16 may function as the matching circuit, the filter circuit, or the matching circuit and the filter circuit. In the radio frequency circuit 1C according to Embodiment 3, in the receiving operation for the first reception signal, the regulator circuit 16 may perform impedance matching, for example, between the transmission/reception filter 110 and the low noise amplifier 13. In the radio frequency circuit 1C according to Embodiment 3, in the receiving operation for the first reception signal, the regulator circuit 16 may function as a notch filter that eliminates, a component with a ½ frequency of that of, for example, the first reception signal input from the transmission/reception filter 110. In the radio frequency circuit 1C according to Embodiment 3, in the receiving operation, the S/N ratio of the first reception signal may thus be improved.

In the radio frequency circuit 1C according to Embodiment 3, in the transmitting operation for the first transmission signal, the common terminal 190 and the selection terminal 191 of the antenna switch 19 are connected. The common terminal 150 and the selection terminal 152 of the first switch 15 are also connected. Accordingly, in the radio frequency circuit 1C according to Embodiment 3, in the transmitting operation for the first transmission signal, the antenna terminal 41 and the transmission path T1 are electrically connected with the antenna switch 19, the transmission/reception filter 110, and the first switch 15 interposed therebetween.

In the radio frequency circuit 1C according to Embodiment 3, in the transmitting operation for the first transmission signal, the first terminal 171 and the second terminal 172 of the second switch 17 are not connectable. Accordingly, in the radio frequency circuit 1C according to Embodiment 3, in the transmitting operation for the first transmission signal, the regulator circuit 16 enters into a state of connection between the common path C1 and the transmission path T1. In the radio frequency circuit 1C according to Embodiment 3, in the transmitting operation for the first transmission signal, the first switch 15 and the regulator circuit 16 thus enter into a state of parallel connection in the path between the power amplifier 14 and the transmission/reception filter 110. However, in the radio frequency circuit 1C according to Embodiment 3, in the transmitting operation for the first transmission signal, the first switch 15 functions as the short-circuit path on behalf of the regulator circuit 16. Accordingly, in the radio frequency circuit 1C according to Embodiment 3, in the transmitting operation for the first transmission signal, the impedance of the regulator circuit 16 observed from the connecting point P1 becomes closer to that in the open state than in receiving operation for the first reception signal. That is, in the radio frequency circuit 1C, in the transmitting operation for the first transmission signal, the first transmission signal is difficult to transmit to the regulator circuit 16. For example, in the transmitting operation for the first transmission signal, the regulator circuit 16 is thus less likely to influence the impedance matching between the power amplifier 14 and the transmission/reception filter 110. Accordingly, for example, even when the impedance differs between the power amplifier 14 and the low noise amplifier 13, the impedance matching between the transmission/reception filter 110 and the low noise amplifier 13 and the impedance matching between the power amplifier 14 and the transmission/reception filter 110 may both be achieved easily. In addition, if the regulator circuit 16 is the notch filter that eliminates, for example, the component with the ½ frequency of that of the first reception signal, the hindering of the transmission of the first transmission signal through the common path C1 by the regulator circuit 16 is reduced in the transmitting operation. Accordingly, in the radio frequency circuit 1C according to Embodiment 3, in the transmitting operation, the signal loss of the transmission signal may be reduced.

Modifications

Hereinafter, modifications of Embodiments 1 to 3 will be described.

Embodiments 1 to 3 above and the like are merely one of various embodiments of the present disclosure. Various modifications may be made to Embodiments 1 to 3 above and the like in accordance with the designing of the present disclosure is achieved. Mutually different components of mutually different embodiments may be combined appropriately. For example, Embodiment 2 or the modification of Embodiment 2 may be applied to Embodiment 3, and thus the reception path R1 may serve as the second signal path in Embodiment 3.

The regulator circuit 16 includes the inductor 161 or the capacitor 162 in the radio frequency circuits 1 to 1C according to Embodiments 1 to 3; however, the configuration is not limited to this. The regulator circuit 16 may include, for example, a resistor. The regulator circuit 16 may include, for example, a variable inductor instead of the inductor 161 and may include a variable capacitor instead of the capacitor 162. The regulator circuit 16 may also include, for example, an acoustic wave filter using a surface acoustic wave, a bulk acoustic wave, and the like.

The radio frequency circuits 1 to 1C according to Embodiments 1 to 3 do not have a matching circuit other than the regulator circuit 16; however, the configuration is not limited to this. For example, the radio frequency circuit 1 may have a matching circuit between the reception filter 11 and the low noise amplifier 13. If the matching circuit is disposed on the second signal path (for example, the transmission path T1), the matching circuit is disposed, for example, between the connecting point P2 and the transmission filter 12, not between the connecting point P2 and the first switch 15. Likewise, if the matching circuit is disposed on the common path C1, the matching circuit is disposed, for example, between the connecting point P1 and the antenna terminal 41, instead of between the connecting point P1 and the common terminal 150 of the first switch 15.

The radio frequency circuits 1 to 1B according to Embodiments 1 and 2 do not have the transmission/reception filter 110; however, the configuration is not limited to this. For example, in the radio frequency circuit 1, the transmission/reception filter 110 may be disposed between the connecting point P1 of the common path C1 and the antenna terminal 41. The radio frequency circuit 1C according to Embodiment 3 does not have the reception filter 11 and the transmission filter 12; however, for example, the reception filter 11 may be disposed on the reception path R1, and the transmission filter 12 may be interposed between the connecting point P2 of the transmission path T1 and the power amplifier 14.

The radio frequency circuits 1 to 1C according to Embodiments 1 to 3 have the antenna terminal 41, and the antenna 3 of the communication apparatus 10 is connected to the antenna terminal 41 of the radio frequency circuits 1 to 1C. However, the configuration is not limited to this. For example, the radio frequency circuits 1 to 1C may include a plurality of antenna terminals, and the communication apparatus 10 may have antennas each connected to a corresponding one of the antenna terminals. In this case, the radio frequency circuit 1 has an antenna switch by which connection of each antenna terminal to one of the transmission path, the reception path, and the common path is selected. The antenna switch may be integrally provided with the first switch 15.

Aspects

Each of radio frequency circuits (1, 1C) according to a first aspect includes an antenna terminal (41), a first switch (15), a power amplifier (14), a low noise amplifier (13), a regulator circuit (16), and a second switch (17). The first switch (15) has a common terminal (150), a first selection terminal (152), and a second selection terminal (151). A common terminal (150) is connected to the antenna terminal (41). The first selection terminal (152) is connectable to the common terminal (150). The second selection terminal (151) is connectable to the common terminal (150). The power amplifier (14) is connected to the first selection terminal (152). The low noise amplifier (13) is connected to the second selection terminal (151). The regulator circuit (16) is connected to a first signal path (C1) and a second signal path (T1). The first signal path (C1) is a path between the antenna terminal (41) and the common terminal (150). The second signal path (T1) is a path between the power amplifier (14) and the first selection terminal (152). The second switch (17) is connected between the second signal path (T1) and the ground. The regulator circuit (16) includes at least one of an inductor (161) or a capacitor (162).

With the radio frequency circuit (1, 1C) according to the aspect, when the antenna terminal (41) and the low noise amplifier (13) are connected, the regulator circuit (16) may be connected between the first signal path (C1) and the ground. Accordingly, in the receiving operation for the radio frequency circuit (1, 1C), not only the impedance or the passband but also the loss of the radio frequency circuit (1, 1C) may be optimized by using the regulator circuit (16). In contrast, in the radio frequency circuit (1, 1C), when the antenna terminal (41) and the power amplifier (14) are connected, the first switch (15) and the regulator circuit (16) may be connected in parallel. Accordingly, in the transmitting operation for the radio frequency circuit (1, 1C), the first switch (15) functions as the short-circuit path on behalf of the regulator circuit (16). Accordingly, in the radio frequency circuit (1, 1C), the circuit characteristics of the radio frequency circuit (1, 1C) may be achieved in both of the transmitting operation and the receiving operation.

Each of radio frequency circuits (LA, 1B) according to a second aspect includes the antenna terminal (41), the first switch (15), the low noise amplifier (13), the power amplifier (14), the regulator circuit (16), and the second switch (17). The first switch (15) has the common terminal (150), the first selection terminal (151), and the second selection terminal (152). The common terminal (150) is connected to the antenna terminal (41). The first selection terminal (151) is connectable to the common terminal (150). The second selection terminal (152) is connectable to the common terminal (150). The low noise amplifier (13) is connected to the first selection terminal (151). The power amplifier (14) is connected to the second selection terminal (152). The regulator circuit (16) is connected to the first signal path (C1) and the second signal path (R1). The first signal path (C1) is a path between the antenna terminal (41) and the common terminal (150). The second signal path (R1) is a path between the low noise amplifier (13) and the first selection terminal (151). The second switch (17) is connected between the second signal path (R1) and the ground. The regulator circuit (16) includes at least one of the inductor (161) or the capacitor (162).

With the radio frequency circuit (1A, 1B) according to the aspect, when the antenna terminal (41) and the power amplifier (14) are connected, the regulator circuit (16) may be connected between the first signal path (C1) and the ground. Accordingly, in the transmitting operation of the radio frequency circuit (1A, 1B), not only the impedance or the passband but also the loss of the radio frequency circuit (1A, 1B) may be optimized by using the regulator circuit (16). In contrast, in the radio frequency circuit (1A, 1B), when the antenna terminal (41) and the low noise amplifier (13) are connected, the first switch (15) and the regulator circuit (16) may be connected in parallel. Accordingly, in the receiving operation of the radio frequency circuit (1A, 1B), the first switch (15) functions as the short-circuit path on behalf of the regulator circuit (16). Accordingly, the circuit characteristics of the radio frequency circuit (1A, 1B) may be achieved in both of the transmitting operation and the receiving operation.

In the radio frequency circuit (1 to 1C) according to a third aspect in the first or second aspect, a connecting point (P2) between one of the second signal paths (T1, R1) and the regulator circuit (16) is directly connected to one of the first selection terminals (152, 151) of the first switch (15).

With the radio frequency circuit (1 to 1C) according to the aspect, when the second signal path (T1, R1) and the first signal path (C1) are connected, the impedance of the first switch (15) is sufficiently lower than the impedance of the regulator circuit (16). Accordingly, the first switch (15) functions as the short-circuit path on behalf of the regulator circuit (16).

In the radio frequency circuit (1 to 1C) according to a fourth aspect in any one of the first to the third aspects, when the common terminal (150) and one of the second selection terminals (151, 152) are connectable, the second switch (17) causes the second signal path (T1, R1) and the ground to be connectable. Further, in the radio frequency circuit (1 to 1C), when the common terminal (150) and the first selection terminal (152, 151) are connectable, the second switch (17) does not cause the second signal path (T1, R1) and the ground to be connectable.

With the radio frequency circuit (1 to 1C) according to the aspect, when the second selection terminal (151, 152) and the first signal path (C1) are connected, one end (16B) of the regulator circuit (16) is connected to the ground. Accordingly, the regulator circuit (16) is connected between the first signal path (C1) and the ground, the circuit characteristics of the radio frequency circuit (1 to 1C) may thus be optimized by using the regulator circuit (16). In contrast, in the radio frequency circuit (1 to 1C), when the second signal path (T1, R1) and the first signal path (C1) are connected, the regulator circuit (16) and the first switch (15) are connected in parallel. At this time, the impedance of the first switch (15) is sufficiently lower than the impedance of the regulator circuit (16), and thus the first switch (15) functions as the short-circuit path on behalf of the regulator circuit (16). Accordingly, in the radio frequency circuit (1 to 1C), the circuit characteristics of the radio frequency circuit (1 to 1C) may be optimized in each of the transmitting operation and the receiving operation.

The radio frequency circuit (1 to 1C) according to a fifth aspect in any one of the first to the fourth aspects, the impedance of the regulator circuit (16) observed from a connecting point (P1) between the first signal path (C1) and the regulator circuit (16) is closer to that in an open state when the common terminal (150) and the first selection terminal (152, 151) are connectable than when the common terminal (150) and the second selection terminal (151, 152) are connectable.

With the radio frequency circuit (1 to 1C) according to the aspect, when the common terminal (150) and the second selection terminal (151, 152) are connectable, the regulator circuit (16) is connected between the first signal path (C1) and the ground and thus function as, for example, a matching circuit or a filter circuit. In contrast, in the radio frequency circuit (1 to 1C), when the common terminal (150) and the first selection terminal (152, 151) are connectable, the impedance of the regulator circuit (16) observed from the connecting point (P1) between the regulator circuit (16) and the first signal path (C1) is close to that in the open state, and thus a signal is difficult to transmit to the regulator circuit (16). Accordingly, in the radio frequency circuit (1 to 1C), the circuit characteristics of the radio frequency circuit (1 to 1C) may be optimized in each of the transmitting operation and the receiving operation.

In the radio frequency circuit (1 to 1C) according to a sixth aspect in any one of the first to the fifth aspects, the first switch (15) and the second switch (17) are included in one IC chip.

With the radio frequency circuit (1 to 1C) according to the aspect, the radio frequency circuit (1 to 1C) may be downsized by integrating the first switch (15) and the second switch (17) into one IC chip.

In the radio frequency circuit (1 to 1C) according to a seventh aspect in any one of the first to the sixth aspects, the regulator circuit (16) includes a notch filter.

With the radio frequency circuit (1 to 1C) according to the aspect, for example, a component with a ½ frequency of that of a reception signal may be eliminated in the receiving operation. Accordingly, even if, for example, a second-order harmonic is generated in the first switch (15), the S/N ratio of the reception signal may be improved. With the radio frequency circuit (1 to 1C), the regulator circuit (16) acts slightly in the transmitting operation, and thus the loss of the transmission signal due to the regulator circuit (16) may be reduced.

In the radio frequency circuit (1 to 1C) according to an eighth aspect in the seventh aspect, the regulator circuit (16) includes a circuit having the inductor (161) and the capacitor (162) that are connected in series.

With the radio frequency circuit (1 to 1C) according to the aspect, the regulator circuit (16) that functions as a notch filter may be implemented with a simplified configuration.

A communication apparatus (10) according to a ninth aspect includes the radio frequency circuit (1 to 1C) and a signal processing circuit (2). The signal processing circuit (2) is connected to at least one of the power amplifier (14) or the low noise amplifier (13) of the radio frequency circuit (1 to 1C).

With the communication apparatus (10) according to the aspect, when the second selection terminal (151, 152) and the common terminal (150) are connected, the regulator circuit (16) may be connected between the first signal path (C1) and the ground. Accordingly, when the second selection terminal (151, 152) and the common terminal (150) are connected, not only the impedance or the passband but also the loss of the impedance of the radio frequency circuit (1 to 1C) may be optimized by using the regulator circuit (16). In contrast, when the second signal path (T1, R1) and the first signal path (C1) are connected by connecting the first selection terminal (152, 151) and the common terminal (150), the first switch (15) and the regulator circuit (16) may be connected in parallel. Accordingly, when the second signal path (T1, R1) and the first signal path (C1) are connected, the first switch (15) functions as the short-circuit path on behalf of the regulator circuit (16). Accordingly, the circuit characteristics of the radio frequency circuit (1 to 1C) may be achieved in both of the transmitting operation and the receiving operation using the radio frequency circuit (1 to 1C).

What is claimed is:

1. A radio frequency circuit comprising:
    an antenna terminal;
    a first switch comprising a common terminal connected to the antenna terminal, a first selection terminal configured to connect to the common terminal, and a second selection terminal configured to connect to the common terminal;
    a power amplifier connected to the first selection terminal;
    a low noise amplifier connected to the second selection terminal;
    a regulator circuit connected to a first signal path between the antenna terminal and the common terminal, and to a second signal path between the power amplifier and the first selection terminal; and
    a second switch connected between the second signal path and ground,
    wherein the regulator circuit comprises at least a capacitor or an inductor.

2. The radio frequency circuit according to claim 1, wherein the first selection terminal of the first switch is directly connected to a node between the second signal path and the regulator circuit.

3. The radio frequency circuit according to claim 1,
    wherein when the common terminal and the second selection terminal are connected, the second signal path is connected to ground through the second switch, and
    wherein when the common terminal and the first selection terminal are connected, the second signal path is not connected to ground through the second switch.

4. The radio frequency circuit according to claim 1, wherein when the common terminal and the first selection terminal are connected, an impedance of the regulator circuit observed from a connecting point between the regulator circuit and the first signal path is closer to impedance in an open state than when the common terminal and the second selection terminal are connected.

5. The radio frequency circuit according to claim 1, wherein the first switch and the second switch are included in a single integrated circuit (IC) chip.

6. The radio frequency circuit according to claim 1, wherein the regulator circuit comprises a notch filter.

7. The radio frequency circuit according to claim 6, wherein the regulator circuit comprises a circuit in which an inductor and a capacitor are connected in series.

8. A communication apparatus comprising:
    a radio frequency circuit according to claim 1; and
    a signal processing circuit connected to the power amplifier or the low noise amplifier of the radio frequency circuit.

9. A radio frequency circuit comprising:
    an antenna terminal;
    a first switch comprising a common terminal connected to the antenna terminal, a first selection terminal configured to connect to the common terminal, and a second selection terminal configured to connect to the common terminal;
    a low noise amplifier connected to the first selection terminal;
    a power amplifier connected to the second selection terminal;
    a regulator circuit connected to a first signal path between the antenna terminal and the common terminal, and to a second signal path between the low noise amplifier and the first selection terminal; and
    a second switch connected between the second signal path and ground,
    wherein the regulator circuit comprises a capacitor or an inductor.

10. The radio frequency circuit according to claim 9, wherein the first selection terminal of the first switch is directly connected to a node between the second signal path and the regulator circuit.

11. The radio frequency circuit according to claim 9,
    wherein when the common terminal and the second selection terminal are connected, the second signal path is connected to ground through the second switch, and
    wherein when the common terminal and the first selection terminal are connected, the second signal path is not connected to ground through the second switch.

12. The radio frequency circuit according to claim 9, wherein when the common terminal and the first selection terminal are connected, an impedance of the regulator circuit observed from a connecting point between the regulator circuit and the first signal path is closer to impedance in an open state than when the common terminal and the second selection terminal are connected.

13. The radio frequency circuit according to claim 9, wherein the first switch and the second switch are included in a single integrated circuit (IC) chip.

14. The radio frequency circuit according to claim 9, wherein the regulator circuit comprises a notch filter.

15. The radio frequency circuit according to claim 14, wherein the regulator circuit comprises a circuit in which an inductor and a capacitor are connected in series.

16. A communication apparatus comprising:
    a radio frequency circuit according to claim 9; and a signal processing circuit connected to the power amplifier or the low noise amplifier of the radio frequency circuit.

* * * * *

UNITED STATES PATENT AND TRADEMARK OFFICE
CERTIFICATE OF CORRECTION

PATENT NO. : 12,463,603 B2  
APPLICATION NO. : 18/327293  
DATED : November 4, 2025  
INVENTOR(S) : Yusuke Kishi Page 1 of 1

It is certified that error appears in the above-identified patent and that said Letters Patent is hereby corrected as shown below:

In the Specification

Column 3, Line 57, "the 2)." should be --the external circuit (for example, the signal processing circuit 2).--

Column 6, Line 7, "the 2)." should be --the external circuit (for example, the signal processing circuit 2).--

Column 19, Line 10, "circuits (LA, 1B) according to" should be --circuits (1A, 1B) according to--

Signed and Sealed this  
Tenth Day of February, 2026

John A. Squires  
*Director of the United States Patent and Trademark Office*